United States Patent
Jung et al.

(10) Patent No.: US 10,659,732 B2
(45) Date of Patent: May 19, 2020

(54) APPARATUS FOR PROVIDING MULTI-PARTY CONFERENCE AND METHOD FOR ASSIGNING ENCODER THEREOF

(71) Applicant: SAMSUNG SDS CO., LTD., Seoul (KR)

(72) Inventors: Ji-Won Jung, Seoul (KR); Jun-Ho Kang, Seoul (KR); Hee-Tae Yoon, Seoul (KR); Hong-Hyeon Lee, Seoul (KR); Ho-Sung Ahn, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/135,138

(22) Filed: Sep. 19, 2018

(65) Prior Publication Data

US 2019/0098254 A1    Mar. 28, 2019

(30) Foreign Application Priority Data

Sep. 22, 2017    (KR) .......................... 10-2017-0122522

(51) Int. Cl.
*H04N 7/15*    (2006.01)
*H04L 29/06*    (2006.01)

(52) U.S. Cl.
CPC ......... *H04N 7/152* (2013.01); *H04L 65/1069* (2013.01); *H04L 65/1083* (2013.01); *H04L 65/403* (2013.01); *H04L 65/605* (2013.01); *H04N 7/155* (2013.01)

(58) Field of Classification Search
USPC ...................................... 348/14.09
See application file for complete search history.

(56) References Cited

U.S. PATENT DOCUMENTS

| | | | | |
|---|---|---|---|---|
| 2012/0287228 A1* | 11/2012 | Mishra | .................. | H04M 3/567 348/14.09 |
| 2014/0267560 A1* | 9/2014 | Bright-Thomas | ...... | H04N 7/152 348/14.08 |
| 2014/0313281 A1* | 10/2014 | Graff | ..................... | H04L 12/185 348/14.09 |

\* cited by examiner

*Primary Examiner* — Maria El-Zoobi
(74) *Attorney, Agent, or Firm* — Sughrue Mion, PLLC

(57) ABSTRACT

An apparatus for providing multi-party conference and a method for assigning an encoder in the apparatus are provided. The apparatus for providing multi-party conference according to one embodiment of the present disclosure includes: an image quality determination module configured to determine an image providing quality for a terminal connected to a multi-party conference created in the apparatus; and an encoder assignment module configured to assign an encoder to the terminal based on the image providing quality, wherein when an assignable encoder does not exist at the time of assigning the encoder, the encoder assignment module retrieves one encoder among previously assigned encoders and assigns the retrieved encoder to the terminal.

17 Claims, 4 Drawing Sheets

APPARATUS FOR PROVIDING MULTI-PARTY CONFERENCE AND METHOD FOR ASSIGNING ENCODER THEREOF

CROSS-REFERENCE TO RELATED APPLICATION(S)

This application claims the benefit under 35 USC § 119(a) of Korean Patent Application No. 10-2017-0122522, filed on Sep. 22, 2017, in the Korean Intellectual Property Office, the entire disclosure of which is incorporated herein by reference for all purposes.

BACKGROUND

1. Field

The following description relates to a technology for providing a multi-party conference.

2. Description of Related Art

A multi-party conference is a remote communication system in which two or more users access a virtual conference room using a terminal and simultaneously conduct a conference using voice and image. By participating in the multi-party conference, people at multiple locations can conveniently collaborate.

In a multi-party conference, a multi-point control unit (MCU) is generally used for image data processing. The MCU decodes image information received from each of the participants, encodes the information at a bitrate required for each participant by mixing the decoded image information, and transmits the encoded information. At this time, an encoder is required for the encoding process.

Since the encoder consumes resources for its operation, the number of encoders that the MCU with limited resources can operate is limited, which leads to the limitation on the number of concurrent participants. Therefore, a method for efficiently managing encoder resources in a multi-party conference is required.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an optimal means for assigning an encoder to a conference participant terminal in a multi-party conferencing apparatus.

In one general aspect, there is provided an apparatus for providing multi-party conference including: an image quality determination module configured to determine an image providing quality for a terminal connected to a multi-party conference created in the apparatus; and an encoder assignment module configured to assign an encoder to the terminal based on the image providing quality, wherein when an assignable encoder does not exist at the time of assigning the encoder, the encoder assignment module retrieves one encoder among previously assigned encoders and assigns the retrieved encoder to the terminal.

The image quality determination module may determine the image providing quality based on one or more of an image providing quality request value received from the terminal, network state information between the terminal and the apparatus, system state information of the apparatus.

When an encoder of the same image providing quality as the determined image providing quality exists among encoders in use in the multi-party conference, the encoder assignment module may assign the encoder of the same image providing quality to the terminal.

When assignable one or more unused encoders exist at the time of assigning the encoder, the encoder assignment module may assign one of the one or more unused encoders to the terminal.

When an assignable unused encoder does not exist at the time of assigning the encoder, the encoder assignment module may determine an encoder retrieval priority for one or more multi-party conferences created in the apparatus, retrieve one encoder among encoders previously assigned to the one or more multi-party conferences based on the encoder retrieval priority, and re-assign the retrieved encoder to the terminal.

The encoder retrieval priority may be determined based on a ratio of the number of assigned encoders to the number of terminals connected to a conference among the one or more multi-party conferences.

For another terminal which was previously using the retrieved encoder, the encoder assignment module may assign an encoder that has been previously assigned in a multi-party conference to which the another terminal is currently connected to the another terminal.

The encoder assignment module may assign an encoder, among one or more encoders being used in the multi-party conference which the another terminal is currently accessing, whose image providing quality is the most similar, but is lower than that of the retrieved encoder to the another terminal.

In another general aspect, there is provided a method for assigning an encoder which is performed by a computing device comprising one or more processors and a memory in which one or more programs to be executed by the one or more processors are stored, the method including: determining an image providing quality for a terminal connected to a multi-party conference created in an apparatus for providing multi-party conference; and assigning an encoder to the terminal based on the image providing quality, wherein when an assignable encoder does not exist at the time of assigning the encoder, the assigning retrieves one encoder among previously assigned encoders and assigns the retrieved encoder to the terminal.

The determining of the image providing quality may include determining the image providing quality based on one or more of an image providing quality request value received from the terminal, network state information between the terminal and the apparatus, system state information of the apparatus.

The assigning of the encoder may include, when an encoder of the same image providing quality as the determined image providing quality exists among encoders in use in the multi-party conference, assigning the encoder of the same image providing quality to the terminal.

The assigning of the encoder may include, when assignable one or more unused encoders exist at the time of assigning the encoder, assigning one of the one or more unused encoders to the terminal.

The assigning of the encoder may include, when an assignable unused encoder does not exist at the time of assigning the encoder, determining an encoder retrieval priority for one or more multi-party conferences created in the apparatus, retrieving one encoder among encoders previously assigned to the one or more multi-party conferences based on the encoder retrieval priority, and re-assigning the retrieved encoder to the terminal.

The encoder retrieval priority may be determined based on a ratio of the number of assigned encoders to the number of terminals connected to a conference among the one or more multi-party conferences.

The assigning of the encoder may include, for another terminal which was previously using the retrieved encoder, assigning an encoder that has been previously assigned in a multi-party conference which the another terminal is currently accessing to the another terminal.

The assigning of the encoder may include assigning an encoder, among one or more encoders being used in the multi-party conference which the another terminal is currently accessing, whose image providing quality is the most similar, but is lower than that of the retrieved encoder to the another terminal.

Other features and aspects will be apparent from the following detailed description, the drawings, and the claims.

Figure 1:
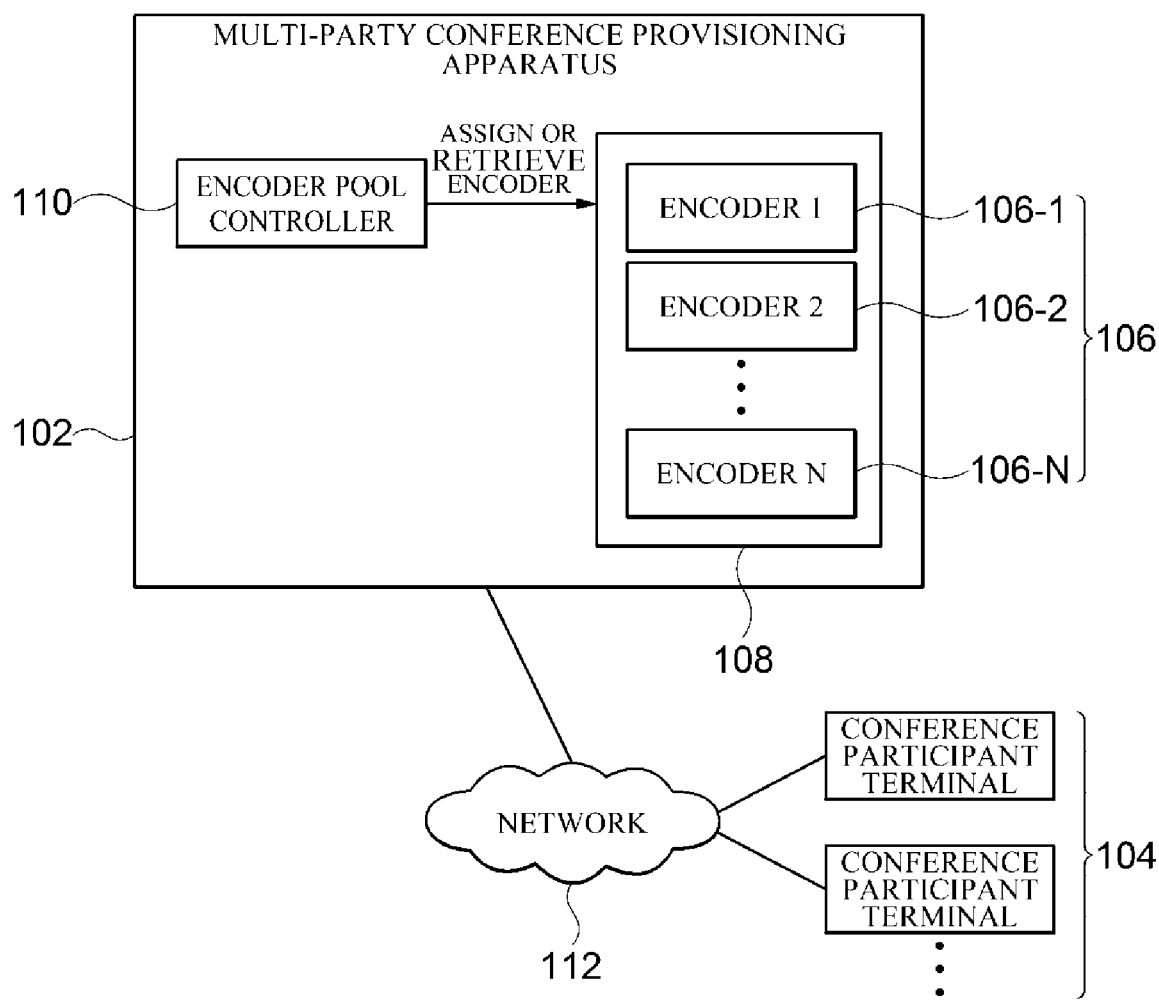
FIG. 1 is a block diagram for describing a multi-party conference provisioning system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram for describing a multi-party conference provisioning system 100 according to one embodiment of the present disclosure. As shown in FIG. 1, the multi-party conference provisioning system 100 includes a multi-party conference provisioning apparatus 102 and a plurality of conference participant terminals 104.

The multi-party conference provisioning apparatus 102 is an apparatus for providing a multi-party conference between the plurality of conference participant terminals 104. In embodiments of the present disclosure, the multi-party conference provisioning apparatus 102 may create a virtual conference room that two or more conference participant terminals 104 can access and relay the transmission and reception of image data, voice data, or both the image and voice data between the conference participant terminals 104 connected to the conference room, so that a multi-party conference can be held.

The multi-party conference provisioning apparatus 102 may include an encoder pool 108 consisting of a plurality of encoders 106 and an encoder pool controller 110. The multi-party conference provisioning apparatus 102 mixes image data received from the plurality of conference participant terminals 104 connected to the multi-party conference, then encodes the mixed image data into a image providing quality suitable for each of the conference participant terminals 104, and transmits the encoded image data to each of the conference participant terminals 104. In this case, the encoders 106 are used for the above-described encoding process.

The encoder pool controller 110 is a controller device for managing the plurality of encoders 106 included in the above-described encoder pool 108 and assigns the encoder 106 to the conference participant terminal 104 or retrieves the encoder 106 which has been previously assigned to the conference participant terminal 104 and is currently in use. For example, when a new conference participant terminal 104 is connected to the multi-party conference, the encoder pool controller 110 may assign a new encoder 105 from the encoder pool 108 to the new conference participant terminal 104 or allow one of encoders previously assigned within the multi-party conference to be shared with the new conference participant terminal 104. If the encoders included in the encoder pool are all used and thus there is no available encoder, the encoder pool controller 110 may forcibly retrieve one of the encoders previously assigned to other terminals and assign the retrieved encoder to the new conference participant terminal 104. Details related to the assignment and retrieving of encoders by the encoder pool controller 110 will be described with reference to FIG. 2.

The conference participant terminal 104 is a terminal used by a conference participant who accesses the multi-party conference provisioning apparatus 102 and takes part in the multi-party conference. In the disclosed embodiments, the conference participant terminals 104 may include any types of communication devices, such as a desktop computer, a notebook computer, a tablet computer, smartphone, etc. which can be provided with audio conference and web conference services.

Meanwhile, the multi-party conference provisioning apparatus 102 and the plurality of conference participant terminals 104 may transmit and receive data therebetween over a communication network 112. In some embodiments, the communication network 112 may include the Internet, one or more local area networks, wide area networks, cellular networks, mobile networks, other types of networks, or a combination thereof.

Figure 2:
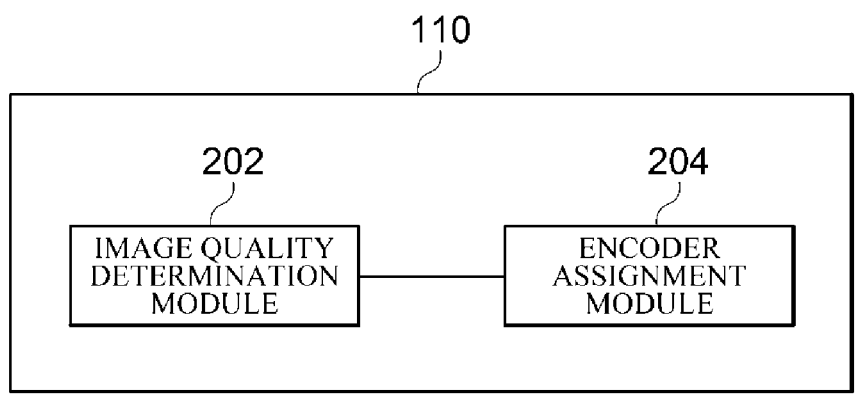
FIG. 2 is a block diagram for describing a detailed configuration of an encoder pool controller according to one embodiment of the present disclosure.

FIG. 2 is a block diagram for describing a detailed configuration of an encoder pool controller 110 according to one embodiment of the present disclosure. As shown in FIG. 2, the encoder pool controller 110 according to one embodiment of the present disclosure includes an image quality determination module 202 and an encoder assignment module 204.

The image quality determination module 202 determines an image providing quality for a conference participant terminal 104 connected to a multi-party conference. In this case, the image providing quality may be a bitrate of an image provided to the conference participant terminal 104. The image quality determination module 202 may be configured to determine an image providing quality for the conference participant terminal 104 according to a preset period of time during the multi-party conference or when the conference participant terminal 104 initially accesses the multi-party conference.

In one embodiment, the image quality determination module 202 may provide the image providing quality by taking into account one or more of a image providing quality request value received from the conference participant terminal 104, network state information (e.g., loss rate, delay, round trip time, and the like) between the conference participant terminal 104 and the multi-party conference provisioning apparatus 102, system state information (e.g., CPU usage, memory availability, and the like) of the multi-party conference provisioning apparatus 102. For example, the image quality determination module 202 may be configured to determine whether an image of a quality requested by the conference participant terminal 104 can be provided by taking into account the network state and system state and determine an optimal image providing quality within an available range when the requested quality of image cannot be provided.

The encoder assignment module 204 assigns an encoder to the conference participant terminal 104 on the basis of the image providing quality determined by the image quality determination module 202.

In one embodiment, when an encoder 106 assigned to another terminal participating in the same multi-party conference as the conference participant terminal 104 is providing the another terminal with a image of the same quality as the image providing quality determined by the image quality determination module 202, the encoder assignment module 204 may further assign the encoder, which has been previously assigned to the another terminal within the multi-party conference, to be shared with the conference participant terminal 104. In this case, the encoder may simultaneously provide an image of the same quality to the conference participant terminal 104 and the another terminal in the same multi-party conference.

If the encoder which provides the image of the same quality does not exist in the multi-party conference, the encoder assignment module 204 checks whether unused encoders which are available to be assigned exist in an encoder pool 108, and, when there are available encoders, assigns one of the unused encoders 106 to the conference participant terminal 104. In this case, the newly assigned encoder 106 may provide a multi-party conference image to the conference participant terminal 104 according to the image providing quality determined by the image quality determination module 202.

Alternatively, however, if there is no assignable unused encoder 106 since all encoders 106 in the encoder pool 108 are currently in use, the encoder assignment module 204 may retrieve one of the previously assigned encoders 106 and assigns it to the conference participant terminal 104. To this end, the encoder assignment module 204 may determine an encoder retrieval priority for each of one or more multi-party conferences created in the multi-party conference provisioning apparatus 102. For example, the priority may be determined according to a ratio of the number of assigned encoders 106 to the number of terminals connected to a conference. For instance, a multi-party conference having the highest ratio of the number of assigned encoders 106 to the number of terminals connected to the conference is assigned a relatively large number of encoders 106 as compared to the number of participants, and thus the corresponding multi-party conference may be given the highest priority.

When a multi-party conference is selected as a target for retrieving encoders according to the priority, the encoder assignment module 204 forcibly retrieves one of the encoders 106 assigned to the corresponding multi-party conference and assigns the same to the conference participant terminal 104 that requires the encoder assignment. A terminal (a terminal whose encoder has been retrieved) that was previously using the retrieved encoder 106 may share the other encoder that has been previously assigned to another terminal within the multi-party conference to which the corresponding terminal is connected. In this case, the encoder assignment module 204 selects an encoder whose image providing quality is the most similar, but is lower than that of the retrieved encoder 106 as the encoder to be shared with the terminal whose encoder has been retrieved. This is because, when the image providing quality of the selected encoder is higher than that of the retrieved encoder 106, it is not possible to provide an image to the terminal whose encoder has been retrieved, and because the sense of difference, which may be experienced by the user due to the change of encoder, can be minimized when the image providing quality is more similar to that of the retrieved encoder.

In one embodiment, the image quality determination module 202 and the encoder assignment module 204 may be implemented on a computing device including one or more processors and a computer-readable recording medium connected to the one or more processors. The computer-readable recording medium may be present inside or outside of the processors and may be connected to the processors by various well-known means. The processors present inside the computing device may allow each computing device to operate according to exemplary embodiments described herein. For example, the processors may execute an instruction stored in the computer-readable recording medium, and the instruction stored in the computer-readable recording medium may be configured to allow the computing device to execute operations according to the exemplary embodiments described herein when executed by the processors.

Figure 3:
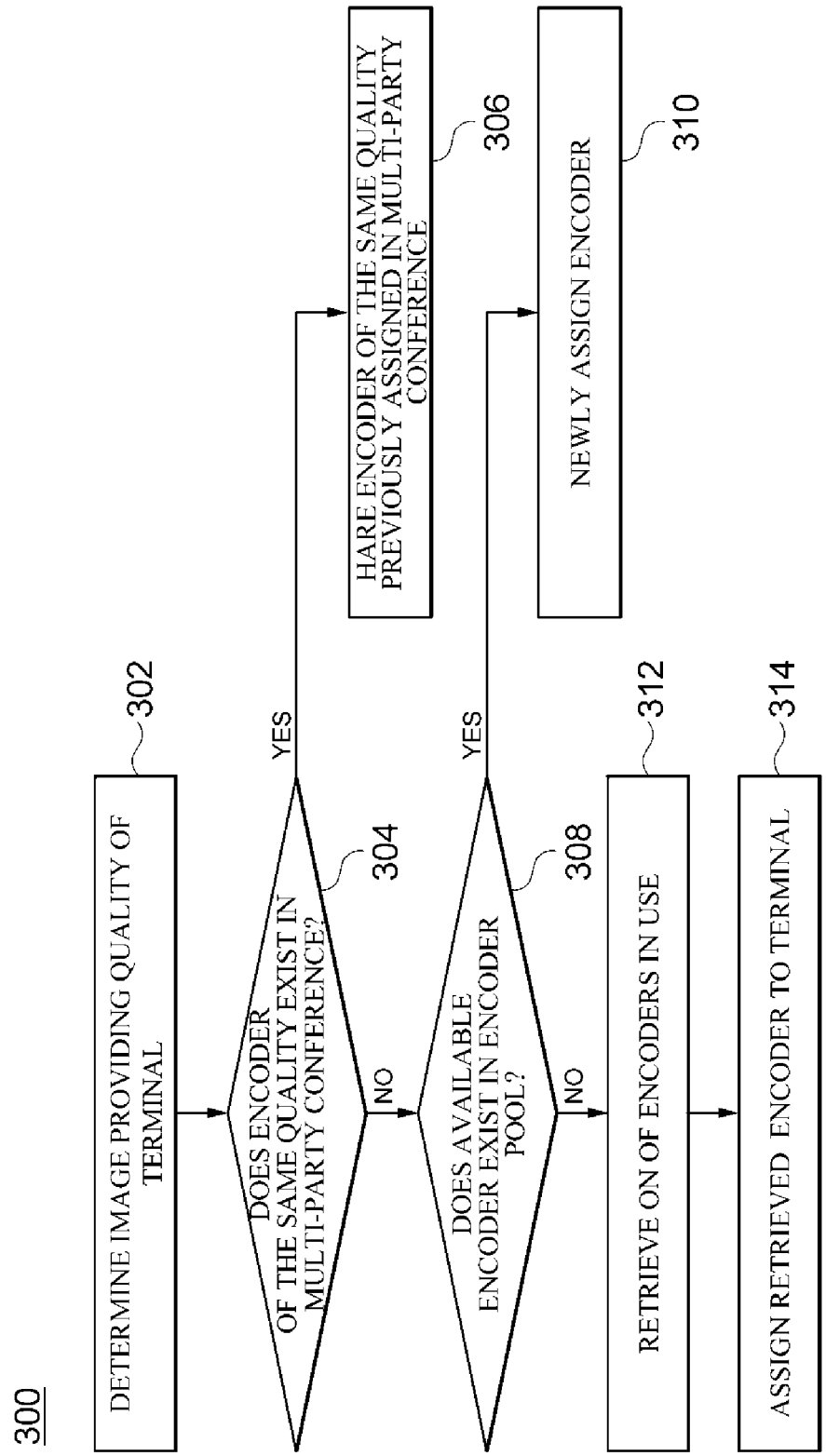
FIG. 3 is a flowchart for describing a method of assigning an encoder according to one embodiment of the present disclosure.

FIG. 3 is a flowchart for describing a method 300 of assigning an encoder according to one embodiment of the present disclosure. The method shown in FIG. 3 may be performed by the above-described encoder pool controller 100. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 302, the image quality determination module 202 determines an image providing quality of a conference participant terminal 104 connected to a multi-party conference. As described above, the image quality determination module 202 may be configured to determine the image providing quality of the conference participant terminal 104 according to a preset period of time during the multi-party conference or when the conference participant terminal 104 initially accesses a multi-party conference.

In operation 304, the encoder assignment module 204 determines whether an encoder 106 that has the same image providing quality as determined in operation 302 exists in encoders 106 previously assigned within the multi-party conference.

When it is determined in operation 304 that the encoder 106 of the same quality exists, the encoder assignment module 204 assigns the corresponding encoder 106 to the conference participant terminal 104, in operation 306.

Alternatively, however, when it is determined in operation 304 that the encoder 106 of the same quality does not exist, the encoder assignment module 204 determines whether available unused encoders 106 exist in an encoder pool 108, in operation 308.

When it is determined in operation 308 that the available encoders 106 exist, the encoder assignment module 204 newly assigns one of the unused encoders 106 to the conference participant terminal 104, in operation 310.

However, if it is determined in operation 308 that the available encoders 106 do not exist, the encoder assignment module 204 retrieves one of the previously assigned encoders 106, in operation 312. The retrieving of an encoder and the re-assignment of an encoder to the terminal whose encoder is retrieved are described in detail with reference to FIG. 2, and thus detailed descriptions thereof will not be reiterated.

In operation 314, the encoder assignment module 204 assigns the retrieved encoder to the conference participant terminal 104.

Figure 4:
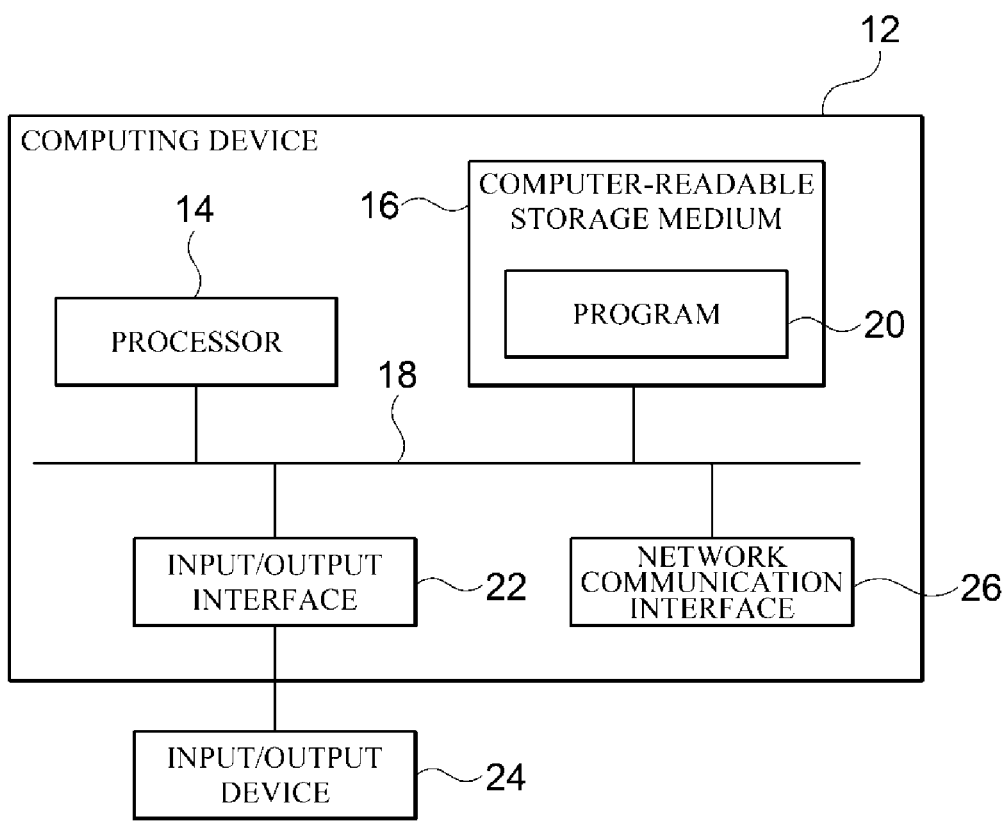
FIG. 4 is a block diagram for describing an example of a computing environment including a computing device suitable to be used in exemplary embodiments.

FIG. 4 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be a multi-party conference provisioning apparatus 102. In addition, the computing device 12 may be a conference participant terminal 104. The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may also include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, an encoder is allowed to be shared by a plurality of conference participant terminals according to a image providing quality to be provided to the conference participant terminals so that it is possible to efficiently use encoders, which are limited resources.

In addition, according to the embodiments of the present disclosure, when a new terminal is connected to a conference, an encoder which has been previously assigned is retrieved and re-assigned as needed, so that the number of accessible participants in the same encoder pool can be increased.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for providing multi-party conference comprising:
   an image quality determination module configured to determine an image providing quality for a terminal connected to a multi-party conference created in the apparatus; and
   an encoder assignment module configured to assign an encoder to the terminal based on the image providing quality,
   wherein when an assignable unused encoder does not exist at a time of assigning the encoder, the encoder assignment module retrieves one encoder among encoders previously assigned to one or more multi-party conferences created in the apparatus and re-assigns the retrieved encoder to the terminal.

2. The apparatus of claim 1, wherein the image quality determination module determines the image providing quality based on one or more of an image providing quality request value received from the terminal, network state information between the terminal and the apparatus, system state information of the apparatus.

3. The apparatus of claim 1, wherein when an encoder which provides an image of the same quality as the determined image providing quality exists among encoders in use in the multi-party conference, the encoder assignment module assigns the encoder which provides the image of the same quality to the terminal.

4. The apparatus of claim 1, wherein when assignable one or more unused encoders exist at the time of assigning the encoder, the encoder assignment module assigns one of the one or more unused encoders to the terminal.

5. The apparatus of claim 1, wherein when the assignable unused encoder does not exist at the time of assigning the encoder, the encoder assignment module determines an encoder retrieval priority for the one or more multi-party conferences created in the apparatus, and retrieves the one encoder among the encoders previously assigned to the one or more multi-party conferences based on the encoder retrieval priority.

6. The apparatus of claim 5, wherein the encoder retrieval priority is determined based on a ratio of a number of assigned encoders to a number of terminals connected to a conference among the one or more multi-party conferences.

7. The apparatus of claim 5, wherein, for another terminal which was previously using the retrieved encoder, the encoder assignment module assigns an encoder, that has been previously assigned in a multi-party conference which the another terminal is currently accessing, to the another terminal.

8. The apparatus of claim 7, wherein the encoder assignment module assigns an encoder, among one or more encoders being used in the multi-party conference which the another terminal is currently accessing, whose image providing quality is the most similar to, but is lower than that of the retrieved encoder, to the another terminal.

9. A method for assigning an encoder which is performed by a computing device comprising one or more processors and a memory in which one or more programs to be executed by the one or more processors are stored, the method comprising:
   determining an image providing quality for a terminal connected to a multi-party conference created in an apparatus for providing multi-party conference; and
   assigning an encoder to the terminal based on the image providing quality,
   wherein when an assignable unused encoder does not exist at a time of assigning the encoder, the assigning retrieves one encoder among encoders previously assigned to one or more multi-party conferences created in the apparatus and re-assigns the retrieved encoder to the terminal.

10. The method of claim 9, wherein the determining of the image providing quality comprises determining the image providing quality based on one or more of an image providing quality request value received from the terminal, network state information between the terminal and the apparatus, system state information of the apparatus.

11. The method of claim 9, wherein the assigning of the encoder comprises, when an encoder which provides an image of the same quality as the determined image providing quality exists among encoders in use in the multi-party conference, assigning the encoder which provides the image of the same quality to the terminal.

12. The method of claim 9, wherein the assigning of the encoder comprises, when assignable one or more unused encoders exist at the time of assigning the encoder, assigning one of the one or more unused encoders to the terminal.

13. The method of claim 9, wherein the assigning of the encoder comprises, when the assignable unused encoder does not exist at the time of assigning the encoder, determining an encoder retrieval priority for the one or more multi-party conferences created in the apparatus, and retrieving the one encoder among the encoders previously assigned to the one or more multi-party conferences based on the encoder retrieval priority.

14. The method of claim 13, wherein the encoder retrieval priority is determined based on a ratio of a number of assigned encoders to a number of terminals connected to a conference among the one or more multi-party conferences.

15. The method of claim 13, wherein the assigning of the encoder comprises, for another terminal which was previously using the retrieved encoder, assigning an encoder, that has been previously assigned in a multi-party conference which the another terminal is currently accessing, to the another terminal.

16. The method of claim 15, wherein the assigning of the encoder comprises assigning an encoder, among one or more encoders being used in the multi-party conference which the another terminal is currently accessing, whose image providing quality is the most similar to, but is lower than that of the retrieved encoder, to the another terminal.

17. The apparatus of claim 5, wherein the encoder assignment module determines a highest encoder retrieval priority for a multi-party conference, which has a highest ratio of the number of assigned encoders to the number of terminals connected to the multi-party conference.

* * * * *